United States Patent [19]

Morgan et al.

[11] Patent Number: 5,697,761
[45] Date of Patent: Dec. 16, 1997

[54] MAILBOX BIN JOB SET EXTRACTOR

[75] Inventors: Paul F. Morgan, Rochester; Richard A. Van Dongen, Newark, both of N.Y.

[73] Assignee: Xerox Corporation, Stamford, Conn.

[21] Appl. No.: 586,473

[22] Filed: Jan. 11, 1996

[51] Int. Cl.$^6$ ................................................. B65H 31/30
[52] U.S. Cl. .................................... 414/790.3; 232/43.3
[58] Field of Search .............................. 414/266, 417, 414/790.3, 269, 270, 272; 232/27, 43.3, 43.4, 53; 271/298; 355/321, 322, 323

[56] References Cited

U.S. PATENT DOCUMENTS

| | | | |
|---|---|---|---|
| 301,288 | 7/1884 | Smalley | 232/43.3 X |
| 2,242,408 | 5/1941 | Turnham | |
| 3,884,458 | 5/1975 | Ryland | 270/58 |
| 3,907,279 | 9/1975 | Ervin | 271/173 |
| 4,083,550 | 4/1978 | Pal | 270/53 |
| 4,348,101 | 9/1982 | Schoenfeld et al. | 355/14 R |
| 4,376,529 | 3/1983 | George et al. | 270/53 |
| 4,414,579 | 11/1983 | Dattilo et al. | 358/256 |
| 4,437,660 | 3/1984 | Tompkins et al. | 271/290 |
| 4,470,356 | 9/1984 | Davis et al. | 109/24.1 |
| 4,501,419 | 2/1985 | Takahashi et al. | 271/288 |
| 4,925,171 | 5/1990 | Kramer et al. | 270/53 |
| 4,970,504 | 11/1990 | Chen | 340/825.31 |
| 5,014,049 | 5/1991 | Bosley | 340/825.31 |
| 5,021,776 | 6/1991 | Anderson et al. | 340/825.31 |
| 5,098,074 | 3/1992 | Mandel et al. | 270/53 |
| 5,295,181 | 3/1994 | Kuo | 379/100 |
| 5,308,058 | 5/1994 | Mandel et al. | 271/297 |
| 5,328,170 | 7/1994 | Coombs et al. | 271/297 |
| 5,342,034 | 8/1994 | Mandel et al. | 270/53 |
| 5,358,238 | 10/1994 | Mandel et al. | 271/298 |
| 5,382,012 | 1/1995 | Mandel et al. | 270/53 |

FOREIGN PATENT DOCUMENTS 0241273  10/1987  European Pat. Off. .

*Primary Examiner*—Janice L. Krizek
*Attorney, Agent, or Firm*—Kevin R. Kepner

[57] ABSTRACT

A dynamic "mailboxing" unit and system for separating by users the sheet outputs of various users of a shared users printer (including facsimile receivers, copiers or combination units). It provides for stacking the sheets sequentially outputted from the printer in separate job sets into one or more temporarily and variably assigned "mailboxes" of a "mailboxing" job sowing accessory unit. The "mailboxing" unit has locking "privacy doors" for restricting access to at least some of the mailbox bins, with electrical unlocking of selected bin doors in response to entry of a user access code. When the door is opened, an access handle is visible and the user can pull the handle which causes the job print sets to be moved to the door opening for easy removal. A second embodiment has the removal handle which extends through the door and when released and pulled by the user causes the door to open and the sets to be moved to the opening. Both embodiments eliminate the necessity of the user reaching into the bin to a possible pinch point.

13 Claims, 6 Drawing Sheets

MAILBOX BIN JOB SET EXTRACTOR

There is disclosed in the embodiments herein a system for providing, with a reduced number of parts and costs, in a printer mailbox job sorter module or other sheet output sorter, a system for easily removing sheets of various sizes from an output sorter bin. Especially, in a mailbox module having lockable private bins for document security. The system may be configured so that upon the opening of a bin door a sets removal member is conveniently provided to eject the set of sheets within the bin, or a set ejector handle may be located outside of the bin so that upon unlocking and moving of the handle the bin door automatically opens.

Disclosed is a "mailbox" and/or sorter system with plural bins or trays for automatically discretely handling and segregating received copier, facsimile or other printer output sheets. This can be an accessory for various printers or copiers. In particular, there is disclosed a low cost system of assisting in the removal of sheets in individual bins or trays of such an output sheet sorting system where such bins or trays have privacy doors, without interfering with other sheet handling operations.

Of particular interest to the first embodiment herein, a device for moving items along a check out counter of a grocery store is disclosed in U.S. Pat. No. 2,242,408 to Turnham, cited in the U.S. Supreme Court decision *A&P v. SUPERMARKET EQUIP. CORP.*, 340 U.S. 147; 71 S. Ct. 127; 1950 U.S. LEXIS 2604; 95 L. Ed. 162; 87 U.S.P.Q. (BNA) 303, (Decided Dec. 4, 1950). This embodiment was inspired by the commercially successful check out counter manual groceries sliders, a "U" shaped upstanding 3 wall member with a handle extending vertically upwards at one side of the open end, which were the subject of said 1950 U.S. Supreme Court patent decision, *Great A&P Tea Co. v. Supermarket Equipment Corp.*, supra.

The disclosed embodiments herein provides "mailbox" units for the output of a shared users system printer with various potential desirable functions, in particular, automatically directing and optionally finishing print jobs from shared user printers to then-available bins of the "mailbox" unit, which bins will then be variably designated for identification and ultimate display to the users whose jobs have been stacked therein, so that the user will be told which bins of the mailbox unit their job outputs are in. i.e., the mailbox unit and/or the system can then display that job bin location information, preferably restricted to the particular user, or team of users.

As further discussed hereinbelow, it will be appreciated that in a modern system or networked office environment, various of the control and software functions described herein may be done in the system print server rather than in the mailbox unit or the printer unit per se.

As disclosed in the embodiment herein, an optional feature of particular interest herein is to provide convenient discrete locked bins security for received print jobs for several different job recipients of shared user printers. That is, also disclosed in the example hereinbelow is electronically controlled bin unlocking for private bins security. These are more accurately described herein as "privacy doors" for certain designated bins. This allows plural recipients to share the same printer or the like receiver, without disclosing, compromising or commingling their separate jobs and/or correspondence. In other words, the disclosed embodiment provides a stand-alone "mailbox" or addressable sorter which can automatically sort and file various conventional output documents (conventional "hard copies", i.e., physical sheets) in discrete designated bins, which can optionally be secured. Yet, as further disclosed, these locked bins can be easily individually unlocked electrically to provide almost instant access to the secured hard copies. With the disclosed system, users or recipients do not need to stand by printers awaiting outputs to avoid their being read, or even accidentally taken, by other users, or commingled together into one stacking tray.

The problem of keeping shared (networked) printer job outputs from becoming mixed up, or accidentally removed by others, especially where commonly stacked, even if the jobs are initially offset, is serious enough that some users have for several years placed manual mailboxes, like Post Office boxes, adjacent the printer, with the boxes labeled with different user names, for manual job sorting. Likewise, for shared facsimile machines.

Of particular interest to the invention claimed herein is the prior partial disclosure of certain limited aspects thereof by one of these same inventors, inter alia, in their prior Xerox Corp. U.S. Pat. No. 5,308,058.

Disclosed in the embodiment herein is an improved "mailboxing" set removal system with additional functions. As to the function and purpose and operation of such exemplary mailbox units per se, and mailboxing systems in general, this is taught in detail in said above cited U.S. Pat. Nos. 5,308,058 or 5,382,012 and other Xerox Corp. U.S. patents such as U.S. Pat. Nos. 5,342,034 or 5,358,238 and 5,295,181, and extensive references cited therein, and thus need not be discussed in detail herein. Such mailbox units can automatically discretely handle and segregate received print job sheets from a shared remote printer, copier, scanner, facsimile, multi-mode or other such printer outputs. The disclosed mailbox units can each desirably be a universal modular or stand-alone unit. One such mailbox unit may be attached to, or even simply moved next to, the output of almost any conventional copier or printer, including facsimile machines or networked electronic mail printers, to normally receive its output of printed sheets. Here also, one or more additional mailbox units may be moved next to a prior such mailbox unit to add additional bins capacity.

Printer mailbox systems do not operate like sorters. They provide an assignable or selected discrete bin or bins for designated users, for all of the printed sheets for a designated user (or shared users), enabling a user's print jobs or other output to be directed into a selected bin so assigned. Preferably, the user's mailbox output is plural, pre-collated, print jobs, with all sheets going to a single bin if it has adequate sheet stacking space, not requiring collation or sorting. Thus, job or addressee "mailboxing" is not "sorting" in the common or usual sense of a collating plural identical copy sheets by sequentially placing each such sheet in a different bin, and repeating those steps. However, similar "sorter" hardware may be employed in part if it can provide rapid random bin access and other desired features.

To express it in another way, a "mailbox" in the example herein takes multiple print jobs from a printer (from user terminals, fax, networked page images, scanned document jobs, or the like, or combinations thereof) and separates the print jobs by users and stacks these hardcopy outputted print jobs into individual bins for individual users, by users. As an additional software option, users may also send print jobs to other users' mailbox bins if desired. Mailbox bins can, in general, be either user assignable, or automatically assigned by the printer, print server, or mailbox unit. Optionally, jobs can be individually stapled or otherwise finished if a stapler or other set binding unit is provided. Optional privacy or security doors with locks can be added to any or all bins if desired. An overflow bin and/or general, shared, stacking tray may also desirably be provided, not assigned to any one user.

A specific feature of the specific embodiments disclosed herein is to provide in a mailbox system for collecting the job sheet output of a shared user printer by separating and stacking print jobs of sets of output sheets for respective users on stacking trays of respective mailbox bins of a mailbox module with openable and closeable privacy doors on at least some of said mailbox bins, the improvement comprising at least one print job sets moving member mounted adjacent said stacking tray of a said mailbox bin having a said privacy door thereon, said print job sets moving member having a manual handle portion accessable when said privacy door is opened so that a set is translated to a bin opening adjacent said privacy door when said handle is moved out of said bin and said print job sets moving member being positioned on said stacking tray in said bin when said privacy door is closed, for stacking further job sheets adjacent thereto.

Further specific features disclosed herein, individually or in combination, include those wherein an interlock prevents said print job sets moving member from being moved while said privacy door is closed; and/or wherein said mailbox bin has an open privacy door detection sensor which is activated by movement of said print job sets moving member when said privacy door is opened; and/or wherein said privacy door pivots downwardly as it opens and/or wherein said privacy door has an automatic opening system for at least partially initially automatically opening said privacy door when its said bin has print job sheets therein to be removed therefrom; and/or wherein said privacy door has an automatically releasable latch, and said privacy door is spring loaded to automatically partially open in response to said spring loading when said latch is released to indicate to a user to unload that bin.

Other specific features of the specific embodiments disclosed herein is to provide a mailbox system for collecting the job sheet output of a shared user printer by separating and stacking print jobs of output sheets for respective users on stacking trays of respective mailbox bins of a mailbox module with openable and closeable mailbox privacy doors on at least some of said mailbox bins, the improvement comprising at least one print job sets moving member mounted on said stacking tray of a said mailbox bin having a said privacy door thereon, said print job sets moving member having a manual handle portion extending external to said privacy door so that when said handle is moved in a direction away from said privacy door, said privacy door is opened and a set is translated to a bin opening adjacent said privacy door by said print job sets moving member and said print job set moving member being positioned on said stacking tray in said bin when said privacy door is closed, for stacking further job sheets therein and/or further comprising a controller and an interlock connected to said controller to prevent said print job sets moving member from being moved until a proper user code is entered into said controller.

Still other specific features of the specific embodiments disclosed herein are to provide a plural bins mailboxing system with a sheet distribution system controlled by a control system to receive and stack plural print jobs of plural sheets of different sheet sizes for plural different recipients inside plural different print job storage mailbox bins, via a sheet feeding entrance to said mailbox bins, said mailbox bins having a manual access opening through Which the print jobs are manually removable from inside a said mailbox bin, the improvement comprising manual job set removal assistance devices respectively independently movably mounted in said mailbox bins to not interfere with said receiving and stacking of print jobs therein yet operatively engage even the smallest sheet size print jobs stacked in said bins, each said manual job set removal assistance device having an extension portion extending out to said manual access opening of said mailbox bin to provide a readily manually grapable handle at said said manual access opening of said mailbox bin by which even the smallest sheet size print jobs inside said bin may be pulled out to said manual access opening by said movable manual job set removal assistance device.

Further specific features disclosed herein, individually or in combination, include those wherein at least some of said print job stacking mailbox bins manual access openings are lockable for privacy access restriction and unlockable for print job removal therefrom; wherein said manual job set removal assistance device is normally locked inside of said mailbox bins and is accessable only when said mailbox bins are unlocked; and/or wherein said movable manual job set removal assistance device is essentially L shaped, with the open side of the L facing said sheet feeding entrance to said mailbox bin and the long side of the L extending towards said mailbox bin manual access opening.

Providing for automatic unlocking of selected mailbox bins locked access or "privacy" bin doors for particular users by "keying in" those users' access codes is another desirable option. See e.g., Xerox Corporation U.S. Pat. No. 5,295,181 by Youti Kuo filed Aug. 24, 1992—Automatic Facsimile Output Recipient Telephoning System, and other art cited herein, including U.S. Pat. No. 4,348,101.

Another desirable feature is a bin assignment display system wherein the mailbox unit has a a central (or bin-associated) LCD or other such bin-identifying operator display, and wherein user's jobs are placed in one, or (if needed) multiple, available bins, with all the appropriate bin(s) identified and displayed for the user name or other identifier, which may also be displayed. See, e.g., U.S. Pat. Nos. 4,501,419 and 4,437,660, further discussed herein, etc.

As particularly noted herein, desirable "mailboxing" feature is secured bins. Prior art on lockable and unlockable copier or printer bins or mail boxes for the output sheets thereof includes EPO application No. 0 241 273 by Xerox Corporation published Oct. 14, 1987, [D/86031 EP], entitled "Limited Access Reproducing Machine Bins", disclosing a reproducing machine with lockable and unlockable bins which can be selected by the user for receiving copy sheets, precollated or uncollated. It teaches alternatively remote user or laser printer input, with copy bin lock boxes, and central computer display bin electrical bin unlocking entry and control usable herewith. Further as to bin locking, U.S. Pat. No. 4,470,356 entitled "Word Processor-Controlled Printer Output Bin Lock Box", issued Sep. 11, 1984, to Datapoint Corp., by D. Davis, et al., discloses a lockbox insertable and removable from an output bin. A security door is closed to allow removal of the box. U.S. Pat. No. 4,437,660 entitled "Word Processor—Controlled Printer Output Scanner Mechanism", also issued Mar. 20, 1984 to Datapoint Corp., is if particular interest as disclosing a scanning mechanism for scanning individualized output bins collecting laser printer output for determining each bins availability, the degree of fullness, and whether or not a lockbox is positioned in the bin. U.S. Defensive Publication No. T102,102 entitled "Access Controlled Copier" Published Aug. 3, 1982 by Albert Bolle, et. al., discloses sorter bins which can be locked to the user by means of a badge reader or the like. The user-entered identification data is entered and recorded on the first copy which is delivered to the locked sorter bin or bins. IBM Corp. U.S. Pat. No.

4,414,579 entitled "Information Transmitting and Receiving Station Utilizing a Copier-Printer" issued Nov. 8, 1983 discloses a secured mailbox located at the bottom of the collator. Xerox Corporation reportedly provided modified copier sorters with locked bins for at least the U.S. State Department many years ago.

Among examples of keyboard or keypad enterable electronic security systems in general are U.S. Pat. Nos. 4,970,504; 5,014,049; and 5,021,776.

References on sliding drawer sorters includes Xerox U.S. Pat. No. 4,925,171 issued May 15, 1990 to W. Kramer, et al, and art cited therein, including Pal U.S. Pat. Nos. 4,083,550, and 3,884,458 to Pitney-Bowes, issued May 20, 1975. Some of these inherently lock when not being loaded or stapled. See also Gradco U.S. Pat. No. 5,328,170 issued Jul. 12, 1994 thereon. Xerox U.S. Pat. No. 4,376,529 to Cliff George shows a "bindexer" system in which individual bins are automatically laterally pivotedl out of an array of bins into a finishing station, especially FIG. 2 and bin pivoting shaft 78.

The presently disclosed apparatus may be readily operated and controlled in a conventional manner with conventional control systems. It is well known in general and preferable to program and execute such control functions and logic with conventional software instructions for conventional microprocessors, with operator input selections, paper path sensor inputs for sheet locations and jams, and output control signals to actuate paper path controlling drives, clutches, solenoids, gates, etc., as is well known and taught by various patents and various commercial copiers, printers, and sorters. Such software may of course vary considerably depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hardwired logic or switching systems.

All references cited in this specification, and their references, are incorporated by reference herein where appropriate for appropriate teachings of additional or alternative details, features; and/or technical background.

Various of the above-mentioned and further features and advantages will be apparent from the specific apparatus and its operation described in the example below, as well as the claims. Thus, the present invention will be better understood from this description of one embodiment thereof, including the drawing figures (approximately to scale) wherein:

Figure 6:
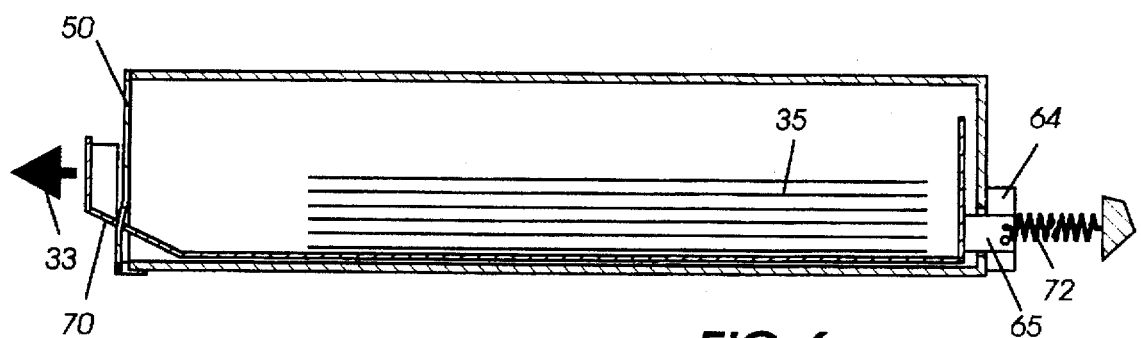
Figure 7:
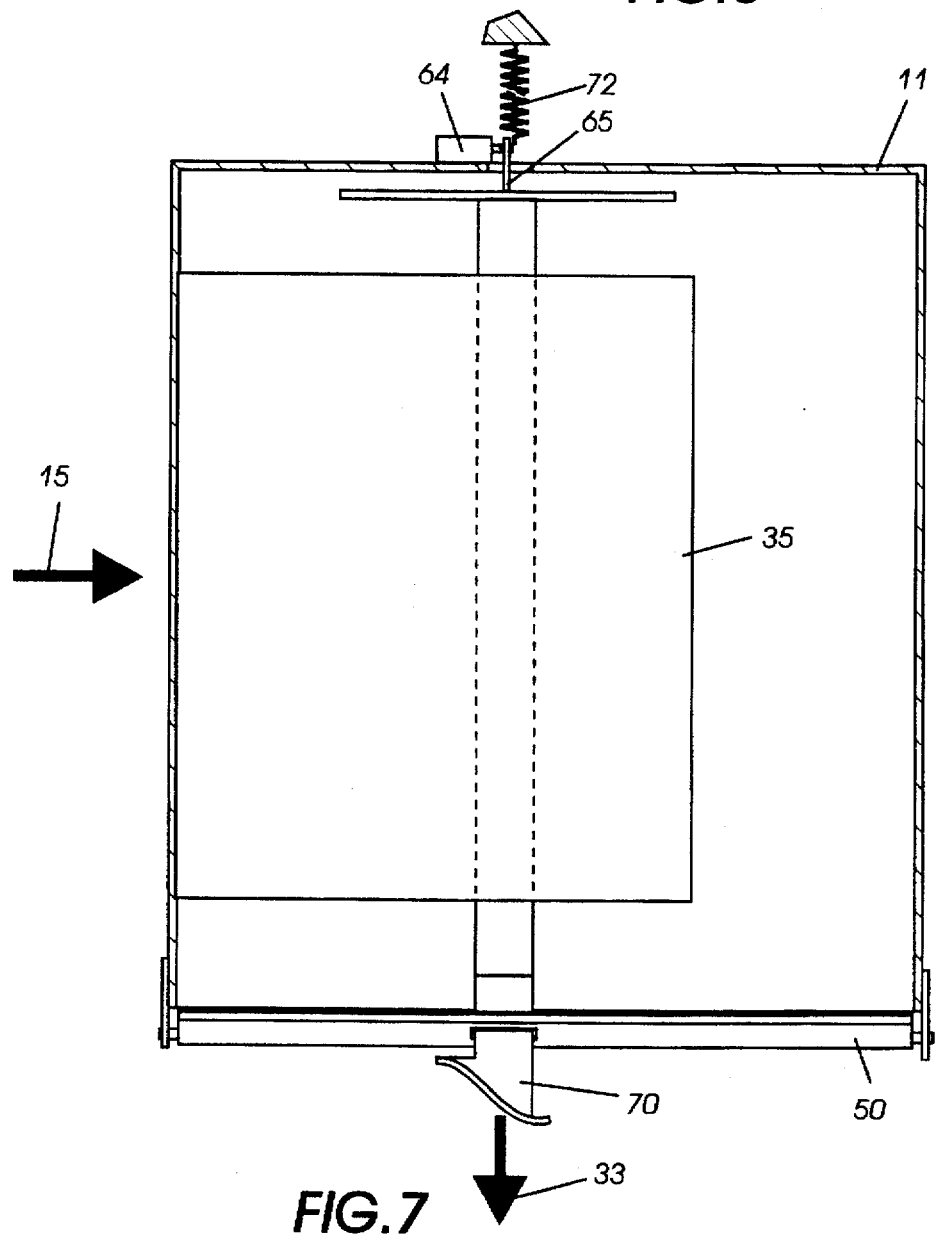
Figure 8:
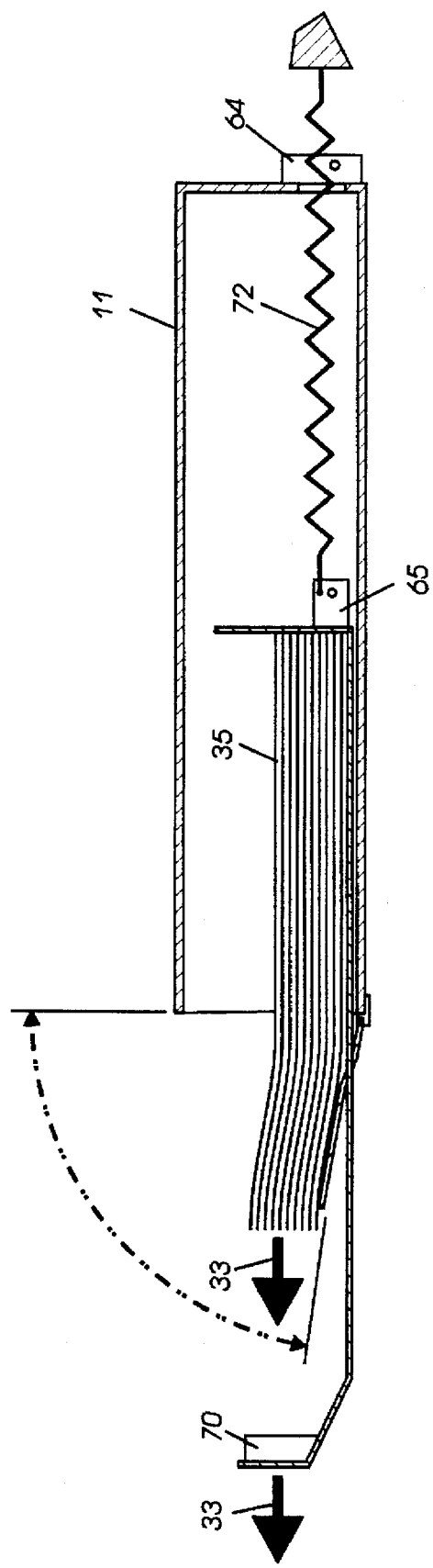
Figure 9:
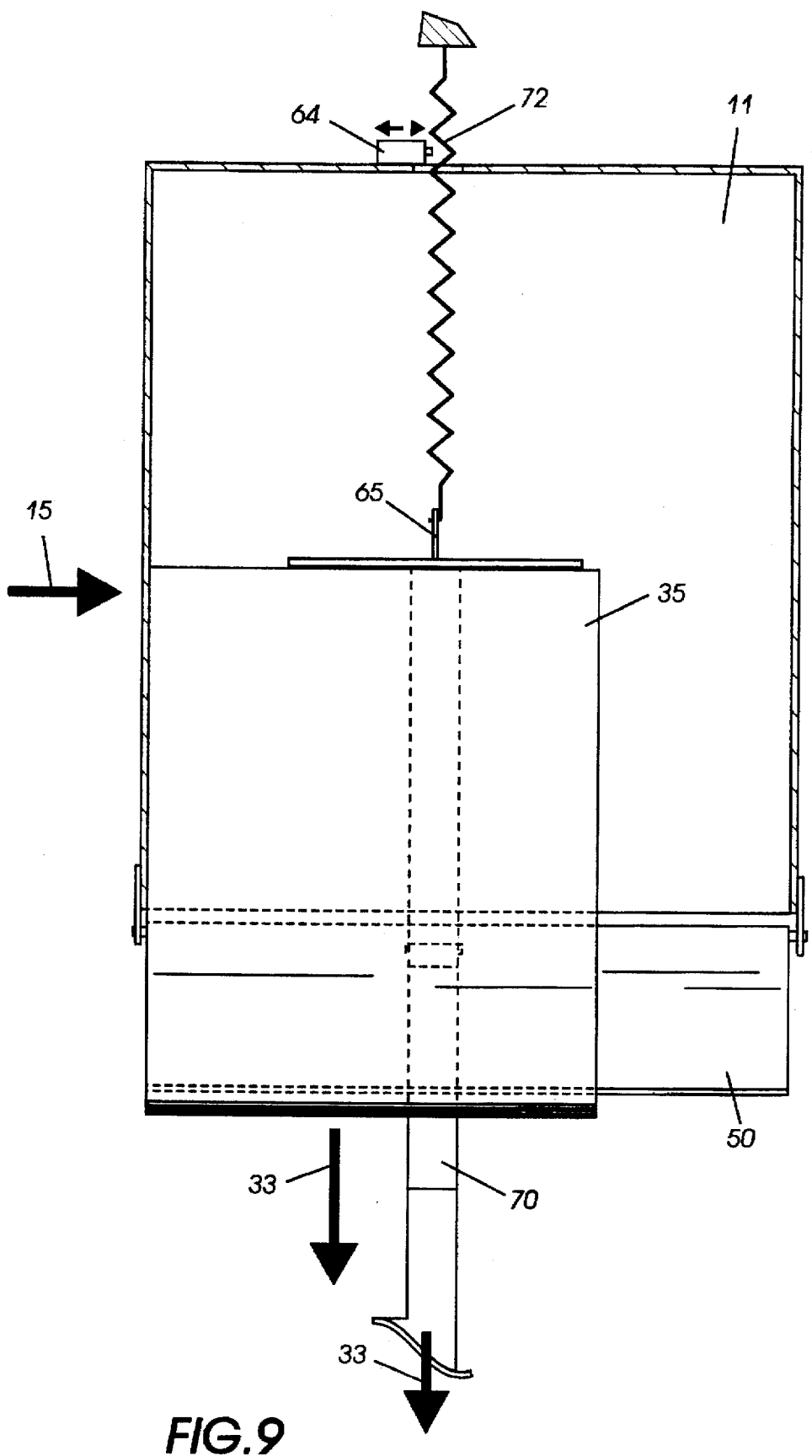

FIGS. 6 and 8 are side elevational views of a second embodiment of the subject set removal device, in which the device extends through the bin privacy door; and FIGS. 7 and 9 are plan views of the second embodiment of the set removing device of FIGS. 6 and 8.

Figure 1:
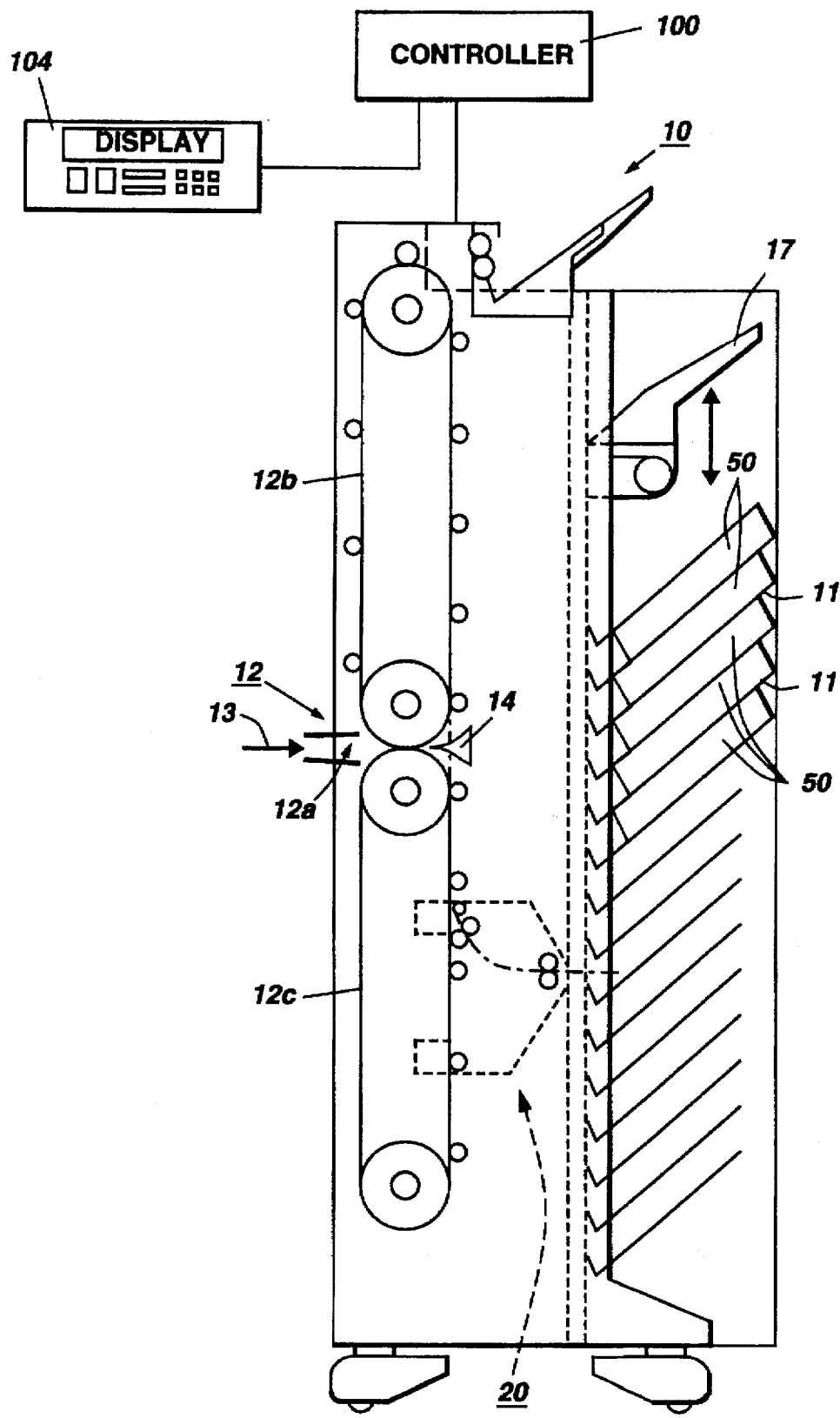
FIG. 1 is a schematic frontal view, partially in cross-section, of one embodiment of a mailbox/finisher/stacker unit incorporating one example of the subject print job sets removal assistance device.

Turning now to the exemplary embodiment 10 of an multi-bin mailbox unit shown in the Figures, it will be appreciated that this is merely one example thereof, and for exemplary purposes is the unit 10 shown in the above-cited U.S. Pat. No. 5,382,012, which may be referred to for further details. The general reference number 10 is utilized here for the entire output unit or module. Likewise, the general reference number 11 will be used throughout for any individual mailbox (or sorter) tray or bin. The printer to which the mailbox system may be operatively connected is only partially shown, for its output at the left side of FIG. 1, since various printers may be so connected to this unit 10, with little or no printer modifications. The illustrated mailbox bins, compiler/stapler, etc., illustrated or described herein are also exemplary, and may individually vary considerably.

The specific example 10 illustrated is a mailbox/finisher/stacker module or unit 10 with a sheet path 12 fed sheets (entered) at a central or intermediate sheet entrance 13 at one side thereof. The sheets are fed into a common path portion 12a, and then into one of two split path vertical sheet transports 12b or 12c respectively branching up or down, as selected by a gate 14. This central sheet path deflector gate 14 may be switched or actuated here into either an up or down position simply by the motion of a finishing carriage 20. Although an exemplary finisher unit or carriage 20 is shown here, it is not required, and similar advantages can be provided in a non-finishing sorter or mailbox module. The module 10 here also includes a high capacity elevator stacking tray 17. The gate 14 is automatically moved into the correct position to direct sheets to either the upper or lower vertical sheet transport paths 12a or 12b by the vertical motion (impact) of the finishing carriage 20 via an extension of the gate 14 extending into its path, as shown, For "mailboxing" functions, the conventionally sequentially received hard copy of plural page collated documents from a pre-collation output electronic printer or the like may be fed into the mailbox unit 10 and automatically fed to the particular bin 11 assignment destination of those job sheets. The mailbox unit 10 preferably directs all designated sheets of a users job to an available bin or bins 11 temporarily assigned to that printer user based on bin availability, or directs the sheets on to another bin 11 in another downstream mailbox unit 10 via the module 40. A variable display (FIG. 1) connected to controller 100 may indicate the bin(s) 11 into which that particular user's jobs have been placed last and not yet removed. These may be plural pre-compiled and/or pre-stapled job sets stacked in a selected user bin, as provided by a compiler/finisher unit.

The mailbox job sorting unit 10 can take sheets inputted at its sheet input 13 from various printer outputs, including multi-functional units. The input 13 may, if desired, be provided with a pivotal or otherwise vertically adjustable input ramp and/or feeder, which may be in an interface module, to align with various levels of printer outputs. Since the output of the printer may be acquired sequentially as individual unstacked sheets as it outputs, no sheet separator is required for the unit 10, and thus a very simple input feeder can be used. It can even be positioned or adapted to reach into the pre-existing sheet output tray of the printer to pull the sheets out of that tray. The unit 10 input preferably has a conventional sheet input sensor actuated by sensing the entrance of a sheet lead edge into its sheet entrance path 12a.

The internal sheet feeding path 12 in the mailbox unit 10 can utilize various known sorter sheet transports, many of which are shown in cited art and other art, providing the sheet path and advantages discussed above are provided. Here, in this example, once each output sheet of the printer has been acquired by the input feeder or the like of the initial common path 12a of the unit 10, the further sheet feeding may be done in path 12b or 12c by the rollers engaging respective sets of belts to form feed nips feeding the sheet along the belts until the sheet meets a bin selection and feeding means which, when activated, deflects the sheet into that selected bin 11. Here the inside flight or bight of the two sets of moving belts and rcarries the sheet thereon upwardly in path 12b (or downwardly in path 12c) from the center of the unit 10 past a respective series of gates or sheet deflectors. The sheet is deflected 11 by a curved surface of the gate for a selected bin 11 when the sheet reaches an opened gate adjacent the selected bin or tray 11. Where a finisher carriage is provided, the sheet is deflected into that units paper path, which then transports the sheet through the carriage to the appropriate, adjacent, bin.

As noted, various components of the mailbox unit 10 can be conventional, even commercially available, except as controlled and modified as described herein. Various feeding and gating arrangements whereby inputted sheets are fed to and gated into selected bins by a moving gate with a positionable sheet deflector, rather than by separate associated deflecting bin gates, as here, are well known in the art. The discussed moving frictional belts transport system and the plural stationary but pivotal sheet deflectors 32 to selectably deflect sheets from the feed belts into the selected bin 11 are merely exemplary.

As noted, the entire operation of the exemplary mailbox module unit 10 here may be controlled by an integral conventional low cost microprocessor controller 100, conventionally programmable with software for the operations described herein. Such a system has more than ample capability and flexibility for the functions described herein, and also for various other functions if desired, such as jam detection and jam clearance instructions.

Optionally, one bin or tray 11 of the unit 10 may (conventionally) provide an open general use tray or bin. The top bin of a sorter is often so used for undesignated or unknown users jobs, jam purges, overcapacity jobs too large for regular bins, etc., since it is not limited in stack height by any overlying tray. Here, the high capacity stacking tray 17 may be the default or public output. Such a designated general use tray may alternatively be the tray or bin 11 located just below the tray 17 output location, where it may be fed sheets via the uppermost or top gate on the lower vertical belt transport 12c. Since all users may have to access a general use tray, this central location ensures that all users can reach it easily.

Examples of systems for variably mounting shelves and/or movable sheet stacking trays to the same frame unit are shown, for example, in the above-cited Mandel et al. U.S. Pat. No. 5,098,074, and in U.S. Pat. No. 3,907,279. Other such variable shelf mounting systems are well known e.g., for wall mounting racks or bookshelves, such as a fixed vertically slotted track into which the "J" shaped ends of bookshelf or rack supports are cantilever mounted.

Note that moving gate sorters (e.g., Norfin Co. Snelling, et al. U.S. Pat. No. 3,414,254) are known in the sorter art. However, typically these have only a single non-pivotal gate, per se, having one set of non-pivotal deflector fingers between the bins and the belt and/or vacuum sheet transport, always extending into the belts, which single gate is moved up and down past the bins by an elevator mechanism. In contrast, here the compiler unit 20 is vertically moved up or down to its adjacent bin, not the gates. Various known elevator systems may be used for the compiler/stapler unit 20 here, such as elongated screw shafts rotated by a motor at their top or bottom, or a driven cable belt and pulley system. The unit 20 can conventionally slide up and down on conventional vertical elevator rails or smooth cylindrical rods. This example here of a sheet job set compiling and stapling and/or ejecting system may be, for example, similar to that disclosed and described in the above and other patent literature including U.S. Pat. No. 5,098,074.

Thus, there is disclosed integral the unit 10 here a single repositionable compact compiling/stapling unit 20 for stacking, registering and attaching sets of printing machine output and ejecting it fully into its them adjacent and thus selected bin 11. In this example, this same compiler/finisher unit 20 may also be positioned to similarly feed sheets or sets of sheets on top of a stack of sheets in the stacking tray 17. However, this is a plural mode operating system, which can also function as a single sheet pass-through feeder, feeding sheets directly sequentially into the bin 11 to stack therein, or on to a bypass transport to pass sheets sequentially on to another module 10.

In the system herein, desirably several, or all, of the bins 11 are partially or fully enclosed, with a normally locked privacy door 50 openable on one side (or end) by a bin door unlocking system 60, as will be further described.

Optionally, the top bin or tray 11 of the unit 10 may conventionally provide an open or "public" bin. A top bin is preferably used for undesignated or unknown user's jobs, jam purges, etc. since it is not limited in stack height by any overlying tray.

Figure 2:
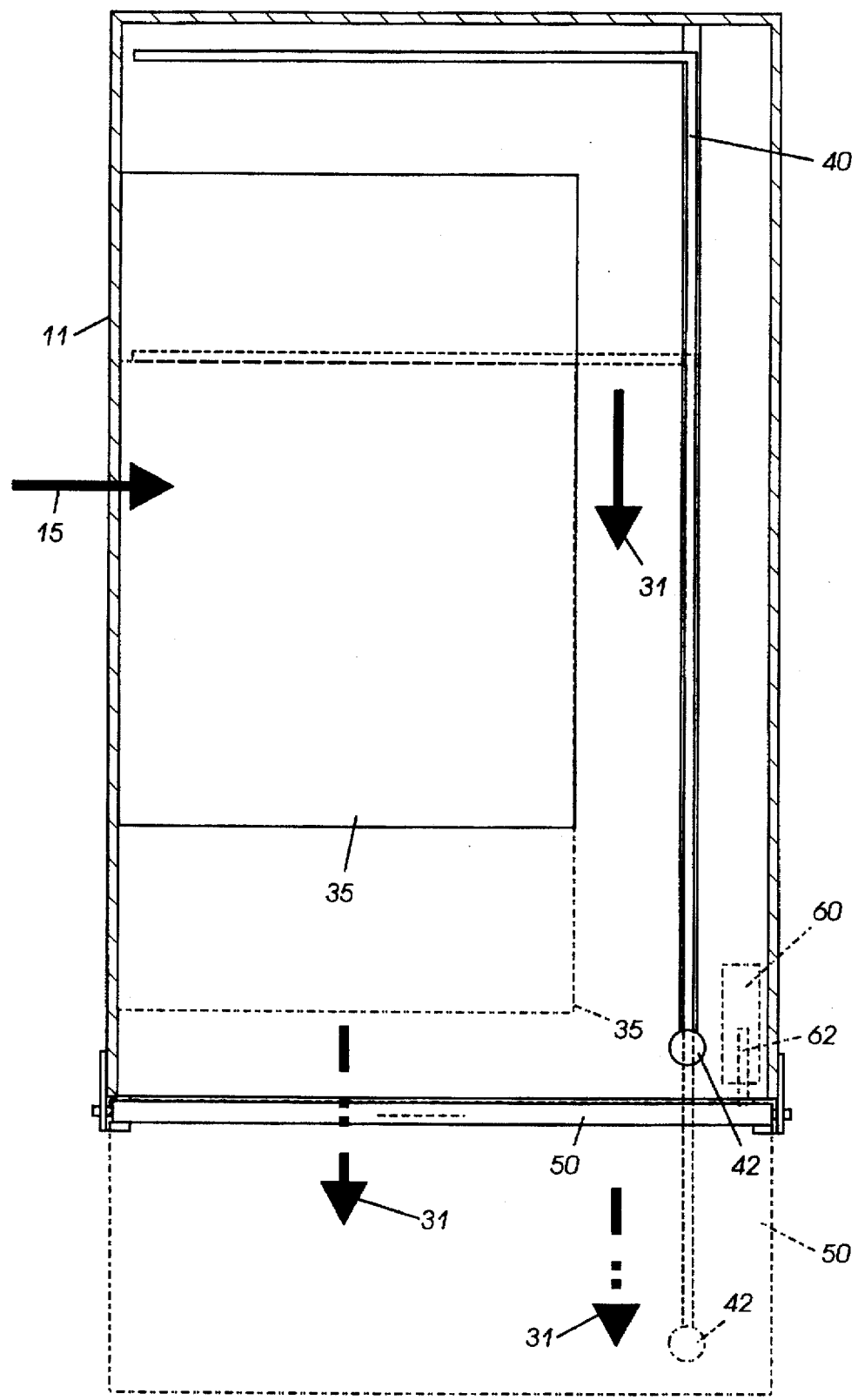
FIG. 2 illustrates a plan view of a bin incorporating a locking mailbox privacy door having a first embodiment of the subject set removing device therein.
Figure 3:
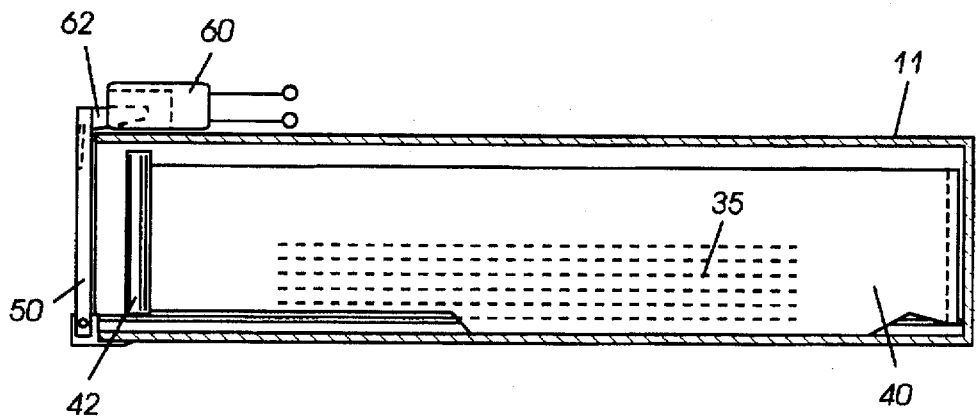
FIGS. 3 through 5 illustrate a side elevational view of a door opening and set moving operating sequence using the FIG. 2 embodiment therein.
Figure 4:
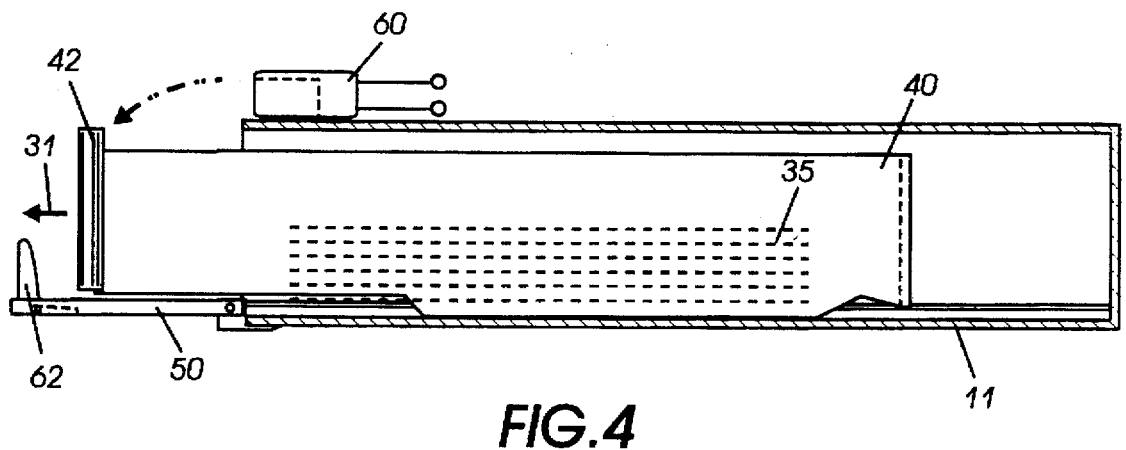
Figure 5:
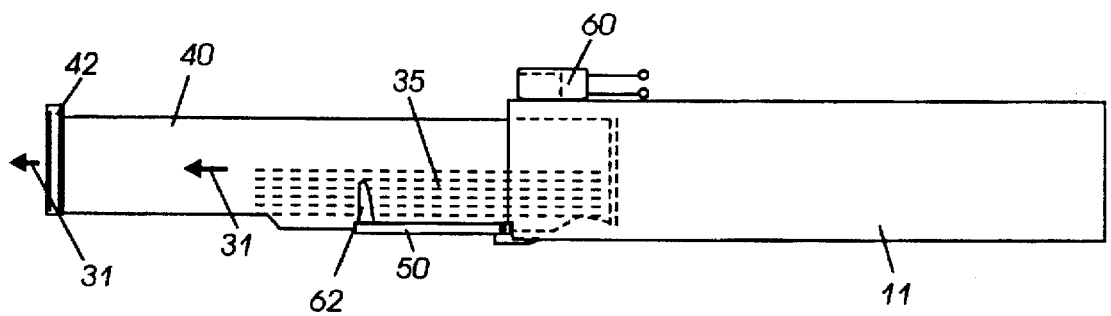

Turning now to the specific print job sets removal device embodiments herein, FIGS. 2–5 illustrate a first embodiment of set removal device. As seen in FIG. 2, there is illustrated a plan view of a single mailbox bin 11 having a privacy door 50 thereon. Sheets are fed into the bin 11 in the direction of arrow 15. The sheets then settle into position as shown and a compiled set of sheets 35 is formed. When an operator is signaled that the print job set 35 is ready to be removed door 50 is opened. In the embodiment shown, bin door 50 is locked by latch actuator unlocking system 60 which retains latch 62. Once a proper user code or PIN number is entered actuator 60 releases latch 62 to allow the bin door 50 to open. The operator can then grasp handle 42 of job set removal member 40 and pull this handle (normally positioned adjacent the bin door) in the direction of arrows 31. The set 35 is contacted by a rear leg of the set removal member 40 and is moved toward the door opening as the handle 42 is pulled out (as shown by movement arrows) to eliminate the necessity or danger of an operator reaching into the bin,. FIGS. 3 through 5 inclusive are side elevations further illustrating the bin opening and set moving sequence as described above.

To describe this first embodiment in different words, there is disclosed a simple, low cost, apparatus and method for customer removal of their print job sets from their assigned "mailboxes" (bins) of a mailbox unit, where the job sets are center or rear registered and thus sets of small size papers may be too far inside the bins to be easily reached, and/or where for safety reasons the users should not reach inside. A simple plastic "L"—shaped upstanding wall member in each such bin at least partially extends across the rear of the stacking area, or has fingers there, and the open side of the "L" faces the sheet input so as not to block it. This "L" member may be spring-loaded to the rear of the bin. An integral job removal pull member (the "T" of the "L") extends out to the front door of the bin to its handle 42. When the bin door opens, the pull handle 42 of the member, preferably of a bright color, is exposed. When this handle is pulled, the rear of of the "L" shaped member pushes the job sets out of the bin from the rear end of the stack. The door opening could also be connected to at least partially pull out the handle when it opens.

FIGS. 6 through 9 illustrate a second embodiment of the subject set moving or removal device of the present invention. In FIG. 6 there is seen the bin 11 having a stacked job set or sets 35 therein. Set moving member 70 extends through the privacy door 50 in this version. Latching mechanism 64 retains a tab 65 at the end of the set moving member 70 opposite the end which extends through door 50. Again, when an operator is notified that the job is complete and then enters the proper code, latch 64 releases tab 65. The operator can then grasp the handle 72 of the set moving member 70 and move the member in the direction of arrow 33. Return spring 72 which is also attached to tab 65 causes the set moving member to retract into the bin 11 when the operator removes the job set 35 and releases handle 72. The angled handle 72 also causes the door 50 to form a sort of ramp at the end of the bin 11 so that the set 35 is easier for an operator to grasp.

Each of the above described set moving devices can also be used when a nonlocking door is utilized. In either case the need for an operator to reach into a bin with fingers and/or hands into potential pinch points is minimized.

After a suitable time delay for bin unloading after it is initiated, an audio beeper (and a visual instructional display on the LCD display 104 or the like) may also desirably be provided to remind the user to reclose (and thus relock) the opened bin door(s), so that they can be reassigned to other users and reused. If the bins are not cleared and/or the bins doors are not so closed after a suitable time delay, another such audio/visual indication or network signal can desirably be provided for that.

Another desired system feature is that the controller 100 displays (and may also indicate to the system, e.g., the printer U.I.) from the mailbox memory, jobs printed more than 24 hours earlier and not yet removed from their bins. The systems administrator and/or key operator may be prompted by messages to remove those old jobs from mailboxes. He or she may be provided codes giving access to any or all bins for that, or other, purposes.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a mailbox system for collecting the job sheet output of a shared user printer by separating and stacking print jobs of sets of output sheets for respective users on stacking trays of respective mailbox bins of a mailbox module with openable and closeable privacy doors on at least some of said mailbox bins, the improvement comprising:
   at least one print job sets moving member mounted adjacent said stacking tray of said mailbox bin having said privacy door thereon, said print job sets moving member having a manual handle portion accessible when said privacy door is opened so that a set is translated through a bin opening adjacent said privacy door when said handle is moved out of said bin so that the set is partially out of said bin;
   said print job sets moving member being positioned on said stacking tray in said bin when said privacy door is closed, for stacking further output sheets adjacent thereto.

2. The mailbox system with mailbox bin privacy doors of claim 1, further comprising an interlock to prevent said print job sets moving member from being moved while said privacy door is closed.

3. The mailbox system with mailbox bin privacy doors of claim 1, wherein said mailbox bin has an open privacy door detection sensor which is activated by movement of said print job sets moving member when said privacy door is opened.

4. The mailbox system with mailbox bin privacy doors of claim 1, wherein said privacy door pivots downwardly as it opens.

5. The mailbox system with mailbox bin privacy doors of claim 1, wherein said privacy door has an automatic opening system for at least partially initially automatically opening said privacy door when its bin has print job sheets therein to be removed therefrom.

6. The mailbox system with mailbox bin privacy doors of claim 1, wherein said privacy door has an automatically releasable latch, and said privacy door is spring loaded to automatically partially open in response to said spring loading when said latch is released to indicate to a user to unload that bin.

7. In a mailbox system for collecting the job sheet output of a shared user printer by separating and stacking print jobs of sets of output sheets for respective users on stacking trays of respective mailbox bins of a mailbox module with openable and closeable mailbox privacy doors on at least some of said mailbox bins, the improvement comprising:
   at least one print job sets moving member mounted on said stacking tray of said mailbox bin having said privacy door thereon, said print job sets moving member having a manual handle portion extending externally to said privacy door so that when said handle is moved in a direction away from said privacy door, said privacy door is opened and a set is translated to a bin opening adjacent said privacy door by said print job sets moving member;
   said print job sets moving member being positioned on said stacking tray in said bin when said privacy door is closed, for stacking further output sheets therein.

8. The mailbox system with mailbox bin privacy doors of claim 7, further comprising;
   a controller;
   an interlock connected to said controller to prevent said print job sets moving member from being moved until a proper user code is entered into said controller.

9. The mailbox system with mailbox bin privacy doors of claim 7, further comprising;
   a controller;
   a locking biasing member attached to said print job sets moving member to prevent said print job set moving member from being moved until a proper user code is entered into said controller and then causing said job set moving member to be partially moved in response to the proper code being entered.

10. The mailbox system with mailbox bin privacy doors of claim 7, wherein said privacy door pivots downwardly as it opens.

11. In a plural bins mailboxing system with a sheet distribution system controlled by a control system to receive and stack plural print jobs of plural sheets of different sheet sizes for plural different recipients inside plural different print job storage mailbox bins, via a sheet feeding entrance to said mailbox bins, said mailbox bins having a manual access opening through which the print jobs are manually removable from inside said mailbox bin, the improvement comprising manual job set removal assistance devices respectively independently movably mounted in said mailbox bins to not interfere with said receiving and stacking of print jobs therein yet operatively engage even the smallest sheet size print jobs stacked in said bins, each said manual job set removal assistance device having an extension portion extending out to said manual access opening of said mailbox bin to provide a readily manually graspable handle at said manual access opening of said mailbox bin by which even the smallest sheet size print jobs inside said bin may be pulled out to said manual access opening by said movable manual job set removal assistance device so that even the smallest sheet size print lobs are partially located outside of said bin when moved by said movable manual job set removal assistance device.

12. The plural bins mailboxing system of claim 11 wherein at least some of said print job storage mailbox bins manual access openings are lockable for privacy access restriction and unlockable for print job removal therefrom, wherein said manual job set removal assistance device is normally locked inside of said mailbox bins and is accessible only when said mailbox bins are unlocked.

13. In a plural bins mailboxing system with a sheet distribution system controlled by a control system to receive and stack plural print jobs of plural sheets of different sheet sizes for plural different recipients inside plural different print job storage mailbox bins, via a sheet feeding entrance to said mailbox bins, said mailbox bins having a manual access opening through which the print jobs are manually removable from inside said mailbox bin, the improvement comprising manual job set removal assistance devices respectively independently movably mounted in said mailbox bins to not interfere with said receiving and stacking of print jobs therein yet operatively engage even the smallest sheet size print jobs stacked in said bins, each said manual job set removal assistance device having an extension portion extending out to said manual access opening of said mailbox bin to provide a readily manually graspable handle at said manual access opening of said mailbox bin by which even the smallest sheet size print jobs inside said bin may be pulled out to said manual access opening by said movable manual job set removal assistance device, wherein said movable manual job set removal assistance device is essentially L shaped, with the open side of the L facing said sheet feeding entrance to said mailbox bin and the long side of the L extending towards said mailbox bin manual access opening.

* * * * *